(12) United States Patent
Seki

(10) Patent No.: US 7,430,573 B2
(45) Date of Patent: Sep. 30, 2008

(54) PROCESSOR

(75) Inventor: Masanobu Seki, Hino (JP)

(73) Assignee: Seiko Epson Corporation, Tokyo (JP)

( * ) Notice: Subject to any disclaimer, the term of this patent is extended or adjusted under 35 U.S.C. 154(b) by 788 days.

(21) Appl. No.: 10/939,593

(22) Filed: Sep. 14, 2004

(65) Prior Publication Data
US 2005/0097155 A1    May 5, 2005

(30) Foreign Application Priority Data
Oct. 29, 2003    (JP)    ............... 2003-369073

(51) Int. Cl.
*G06F 7/00*    (2006.01)
(52) U.S. Cl. ..................................... 708/201
(58) Field of Classification Search .................. 708/201
See application file for complete search history.

(56) References Cited

U.S. PATENT DOCUMENTS

| 4,953,115 | A |   | 8/1990 | Kanoh |         |
|-----------|---|---|--------|-------|---------|
| 5,944,771 | A | * | 8/1999 | Shiraishi | 708/201 |
| 5,954,786 | A | * | 9/1999 | Volkonsky | 708/201 |
| 5,957,996 | A | * | 9/1999 | Shiraishi | 708/201 |
| 6,073,150 | A | * | 6/2000 | Volkonsky | 708/201 |

FOREIGN PATENT DOCUMENTS

| EP | 0 328 063 A2 | 8/1989 |
| EP | 0 520 298 A2 | 12/1992 |
| EP | 1 087 290 A1 | 3/2001 |
| JP | 05-035445 A  | 2/1993 |

* cited by examiner

*Primary Examiner*—David H Malzahn
(74) *Attorney, Agent, or Firm*—Oliff & Berridge, PLC

(57) ABSTRACT

In a processor, an ALU or a decode portion comprises a sign reversal portion 101 for reversing the sign of a first input value, a sign determination portion 102 for determining the sign of a second input value, and an output selection portion 103 for selectively outputting the first input value, if the determination result of the sign determination portion 102 is positive, selectively outputting the value inputted from the sign reversal section, if it is negative, or outputting zero if it is zero.

4 Claims, 3 Drawing Sheets

PROCESSOR

BACKGROUND OF THE INVENTION

1. Field of the Invention

The present invention relates to a processor, and more particularly to a processor that is suitably employed for a CPU and the like that processes the digital data at high speed.

2. Description of the Related Art

Conventionally, a technique for performing the processing for special purposes at high speed in the CPU (Central Processing Unit) has been is closed in Japanese Patent Laid-Open No. 5-35445 (JP5-35445A).

In the patent publication of JP5-35445A, the technique has been disclosed in which a predetermined operation is performed in advance based on the determination of absolute value, and one cycle instruction of choosing one operation from a plurality of operations is added to shorten the operation time.

SUMMARY OF THE INVENTION

However, the technique as described in JP5-35445A could not calculate the symmetric values (symmetric around the center of zero, or symmetric around the center of any value) or the absolute value frequently employed in the digital signal processing of multi-media data such as MPEG (moving picture expert group) at a high speed and at a short step.

Thus, it is an object of the invention to provide a processor capable of calculating the symmetric values or the absolute value frequently employed in the digital signal processing at a high speed and at a short step.

In order to accomplish the above object, the present invention provides a processor having a decode portion for decoding the fetched data, and a processing portion for performing an operation based on the decoded result, wherein at least one of the decode portion and the processing portion comprises a sign reversal section (e.g., sign reversal portion 101 in FIG. 2) for reversing the sign of a first input value, a sign determination section (e.g., sign determination portion 102 in FIG. 2) for determining the sign of a second input value, and an output selection section (e.g., output selection portion 103 in FIG. 2) for selectively outputting the first input value, if the determination result of the sign determination section is positive, selectively outputting the value inputted from the sign reversal section, if it is negative, or outputting zero if it is zero.

With this constitution, the processing (operation) is performed at one step, one cycle of clock, though conventionally a plurality of processings (steps) are required.

Also, the invention provides the processor, wherein the first input value and the second input value are made the same value, so that the output selection section outputs the absolute value of the same value.

Thereby, the processing is performed by one instruction, though conventionally five instructions are required to calculate the absolute value. Further, a disorder in the pipeline processing is avoided and the processing time is shortened.

Also, the invention provides the processor, wherein the first input value and the second input value are made the same value, an output value from the output selection section for the input values and a predetermined value are added, the addition result is inputted as the first input value, and the same value is inputted as the second input value, whereby the addition result of adding the absolute value of the first input value and the absolute value of the second input value with zero being the base is outputted.

Thereby, the processing (acquiring the symmetric values around the center of zero) frequently occurring in the digital signal processing is realized in short assembler code, preventing a disorder in the pipeline processing due to conditional branch, and greatly shortening the processing time. Also, since the number of program steps is decreased, the image processing or audio processing becomes faster, and the operation clock can be slower, whereby the consumption power is suppressed.

Also, the invention provides the processor, further comprising an addition section for adding the output value from the output selection section and the second input value, and outputting the addition result of adding the absolute value of the first input value and the absolute value of the second input value with reference to the second input value.

Thereby, the processing (acquiring the symmetric values around the center of any value) frequently occurring in the digital signal processing is realized in short assembler code, preventing a disorder in the pipeline due to conditional branch, and greatly shortening the processing time. Also, since the number of program steps is decreased, the processing becomes faster, and the operation clock can be slower, whereby the consumption power is suppressed.

DETAILED DESCRIPTION OF THE PREFERRED EMBODIMENTS

A processor according to an embodiment of the present invention will be described below with reference to the accompanying drawings.

Embodiments of the Invention

First of all, the configuration of the processor will be described.

Figure 1:
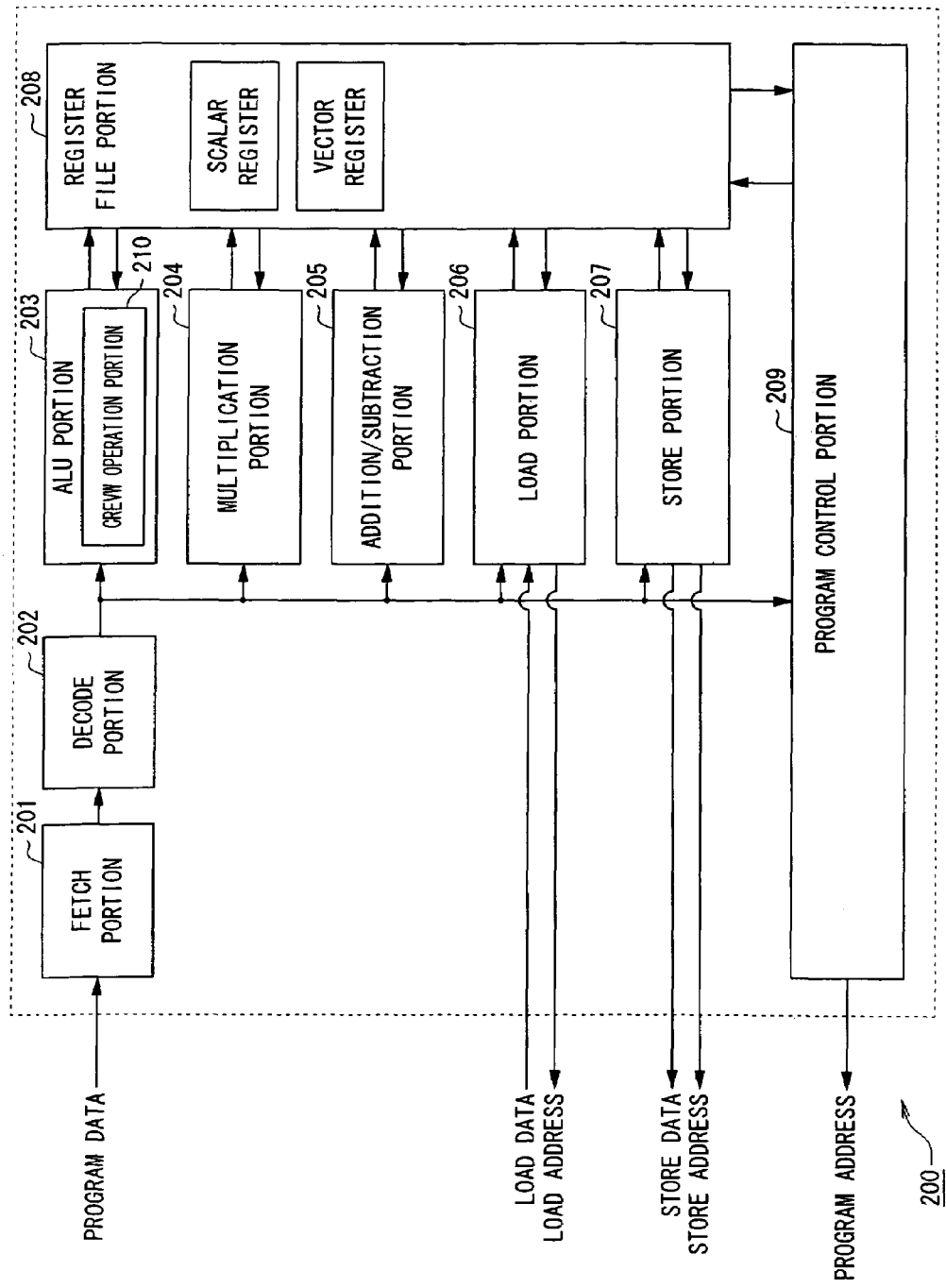
FIG. 1 is a block diagram showing the configuration of a processor to which the invention is applied.

FIG. 1 is a block diagram showing the configuration of the processor to which the invention is applied.

In FIG. 1, a processor 200 comprises a fetch portion 201, a decode portion 202, an ALU (Arithmetic and Logical Unit) portion 203, a multiplication portion 204, an addition/subtraction portion 205, a load portion 206, a store portion 207, a register file portion 208, and a program control portion 209.

The fetch portion 201 fetches an instruction code from a memory, not shown. And the fetch portion 201 temporarily stores the fetched instruction code, and then outputs it to the decode portion 202.

The decode portion 202 decodes the instruction code input from the fetch portion 201, and outputs the decoded result to the ALU portion 203, the multiplication portion 204, the addition/subtraction portion 205, the load portion 206 and the store portion 207. Also, the decode portion 202 similarly outputs the decoded result to the program control portion 209.

The ALU portion 203 reads the data for operation from the register file portion 208, based on the decode result, if the decoded result inputted from the decode portion 202 is logical operation. And the ALU portion 203 performs the logical operation of read data, and outputs the operation result to the register file portion 208. Also, the ALU portion 203 is provided with the CREVW operation portion 210 (described later) if the decoded result inputted from the decode portion 202 is CREVW instruction, a predetermined processing is performed in the CREVW operation portion 210, and the operation result is outputted to the register file portion 208.

The multiplication portion 204 reads the data to be multiplied from the register file portion 208, based on the decoded result, if the decoded result inputted from the decode portion 202 is multiplication. And the multiplication portion 204 executes the multiplication of read data, and output the multiplication result to the register file portion 208.

The addition/subtraction portion 205 reads the data to be added or subtracted from the register file portion 208, based on the decoded result, if the decoded result inputted from the decode portion 202 is addition or subtraction. And the addition/subtraction portion 205 executes the addition or subtraction of read data and outputs the addition/subtraction result to the register file portion 208.

The load portion 206 outputs the address of load instruction to the memory, based on the decoded result, if the decoded result inputted from the decode portion 202 is the load instruction. And the load portion 206 outputs the input data to the register file portion 208, if the data at the address of load instruction is inputted from the memory.

The store portion 207 reads the data for store instruction from the register file portion 208, based on the decoded result, if the decoded result inputted from the decode portion 202 is the store instruction. And the store portion 207 outputs the address of store instruction and the data read from the register file portion 208 to the memory.

The register file portion 208 comprises a predetermined number of scalar registers and vector registers to store the data for operation in the ALU portion 203, the multiplication portion 204, the addition/subtraction portion 205, the load portion 206 and the store portion 207. Also, a control signal for reading or writing data from the program control portion 209 is inputted into the register file portion 208.

The CREVW operation portion 210 that is the essential part of the invention will be described below.

Figure 2:
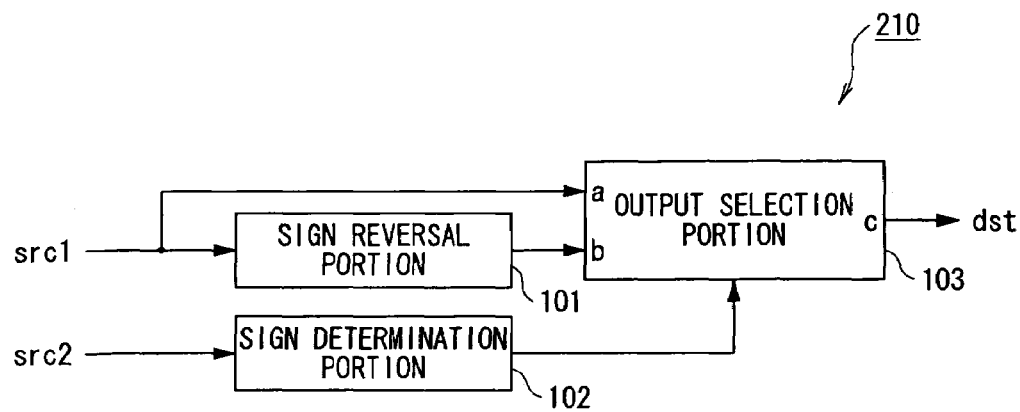
FIG. 2 is a block diagram showing the configuration of a CREVW operation portion 210.

FIG. 2 is a block diagram showing the configuration of the CREVW operation portion 210.

In FIG. 2, the CREVW operation portion 210 comprises a sign reversal portion 101, a sign determination portion 102, and an output selection portion 103.

The load data src1 supplied from the load portion 206 is supplied to the sign reversal portion 101 and the input end a of the output selection portion 103, and the load data src1 having the sign reversed by the sign reversal portion 101 is supplied to the input end b of the output selection portion 103.

On the other hand, the load data src2 supplied from the load portion 206 is supplied to the sign determination portion 102 to determine the sign, the sign determination result being supplied to the output selection portion 103.

The output selection portion 103 selects the load data src1 supplied from the input end a, and outputs it from the output end c, if the inputted sign determination result is positive, or selects the data (sign reversal value) supplied from the input end b, and outputs it from the output end c, if the inputted sign determination result is negative. Also, if the inputted sign determination result is zero, zero is outputted from the output end c. This output selection portion 103 has a feature that the operation is performed in one cycle over the CREVW operation portion.

How the use of the CREVW operation portion 210 hat is the essential part of the invention makes the operation faster will be described below, employing three examples. The CREVW operation portion 210 can be used in the same way as the conventional assembler code by appending the following assembler code to the conventional assembler code. Though the CREVW operation portion 210 is provided within the ALU portion 203 in the above description, it may be provided in the decode portion 202.

<Added assembler code>
CREVW % dst, % src1, % src2

Explanation: this assembler code stores the contents of a source register (src1) into a destination register (dst), when a source register (src2) is positive, or reverses the sign of the source register (src1) and stores the result into the destination register (dst), when it is negative. When the source register (src2) is zero, zero is stored in the destination register (dst).

(When the Absolute Value is Calculated by One Instruction)

First of all, an instance where the absolute value is calculated by one instruction will be described below.

Using the assembler code and CREVW, the calculation of the absolute value is performed through one instruction,
CREVW % y, % x, % x.

Figure 3:
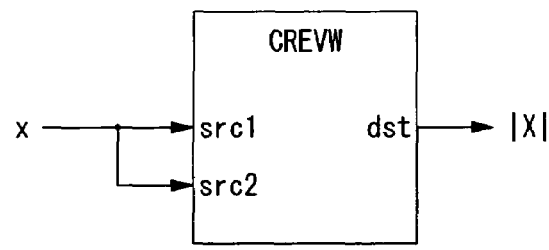
FIG. 3 is a view showing an execution flow in calculating the absolute value through one instruction.

FIG. 3 is a view showing an execution flow in calculating the absolute value through one instruction.

If the inputs src1 and src2 are specified as x (same value), the output dst is |x|.

This operation in the conventional assembler code is described as follows.
ADDI % y, % x, #0
BGEZ % x, LABEL
NOP
SUBI % y, #0, % x
LABEL;

Though five instructions to calculate the absolute value were conventionally needed in the above way, the same operation is performed by one instruction in the present invention.

Also, the conditional branch is included in the assembler code such as "BGEZ" in the conventional description of the assembler code, whereby the program counter is saved and restored, causing a disorder in the pipeline processing, and producing a time loss beyond a program step. However, in this invention, the conditional branch is avoided and the processing time is shortened.

(When the Symmetrical Values are Calculated Around the Center of Zero)

An instance where the symmetrical values, namely, y=± (|x|+m), are calculated around the center of zero will be described below.

This operation enables fast addition or subtraction for the absolute value that is often employed in the DCT or butterfly operation to make the operation for acquiring a greater value if the value is positive, or a smaller value if the value is negative (adding constant m if x is positive, or subtracting constant m if x is negative).

Figure 4:
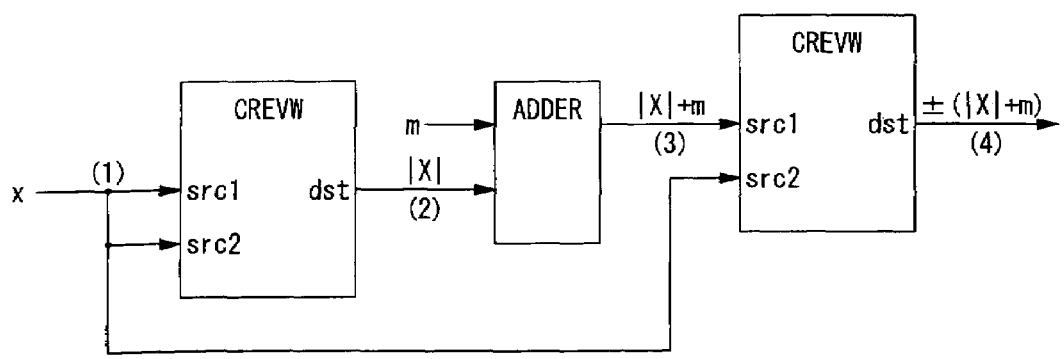
FIG. 4 is a view showing an execution flow in calculating the symmetric values around the center of 0 (zero)

FIG. 4 is a view showing an execution flow in calculating the symmetric values around the center of 0 (zero).

In this case, the assembler code is described as follows.
LW % x (1)
CREVW % y, % x, % x (2)
ADDI % y, % y, #m (3)
CREVW % y, % y, % x (4)

This operation includes loading the value of x from the memory at (1), calculating the absolute value of x at (2), adding m to the absolute value of x at (3), and deciding the sign of the value of adding m to the absolute value of x at (4) (positive if x is positive, or negative if x is negative).

From the above, the processing frequently occurring in the digital signal processing is realized in short assembler code, preventing a disorder in the pipeline processing due to conditional branch, and greatly shortening the processing time. Also, since the number of program steps is decreased, the image processing or audio processing becomes faster, and the operation clock can be slower, whereby the consumption power is suppressed.

(When the Symmetric Values are Calculated Around the Center of x).

An instance where the symmetric values, namely, y=x+m, y=x or y=x−m are calculated around the center of x depending on whether x is positive, zero or negative will be described below.

This operation is addition or subtraction that is often employed in the DCT or butterfly operation to make faster the operation for calculating a greater value if the value is positive, or a smaller value if the value is negative (adding constant m if x is positive, performing no operation if the value is zero, or subtracting m if x is negative).

Figure 5:
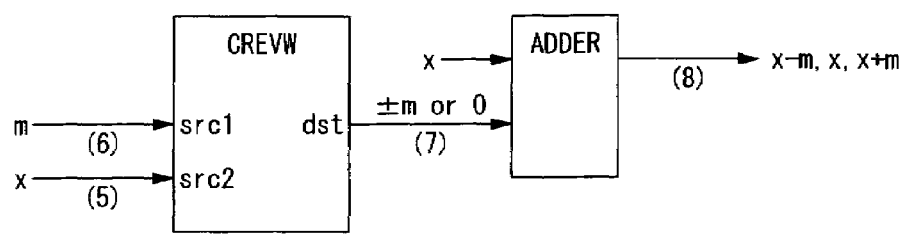
FIG. 5 is a view showing an execution flow in calculating the symmetric values around the center of x (any value).

FIG. 5 is a view showing an execution flow in calculating the symmetric values around the center of x.

In this case, the assembler code is described as follows.

LW % x (5)

LI % a, #m (6)

CREVW % y, % a, % x (7)

ADD % y, % y, % x (8)

This operation includes loading the value of x from the memory at (5), storing constant m in address a at (6), deciding the sign of a at (7) (positive if x is positive, zero if x is zero, or negative if x is negative), and adding m to the value of x at (8) (x+m if x is positive, x−m if x is negative, or no operation if x is zero).

From the above, the processing frequently occurring in the digital signal processing is realized in short assembler code, preventing a disorder in the pipeline processing due to conditional branch, and greatly shortening the processing time. Also, since the number of program steps is decreased, the image processing or audio processing becomes faster, and the operation clock can be slower, whereby the consumption power is suppressed.

As described above, with this invention, the symmetric values (symmetric values around the center of zero, or symmetric values around the center of any value) or the absolute value frequently employed in the digital signal processing for multi-media data such as MPEG can be obtained at high speed and short program steps, whereby the information processing apparatus such as a portable terminal or an electronic camera can be driven at high speed and low consumption power.

What is claimed is:

1. A processor having a decode portion for decoding the fetched data, and a processing portion for performing an operation based on the decoded result, wherein at least one of said decode portion and said processing portion comprises:

a sign reversal section for reversing the sign of a first input value;

a sign determination section for determining the sign or zero of a second input value; and an output selection section for selectively outputting said first input value, if the determination result of said sign determination section is positive, selectively outputting the value inputted from said sign reversal section, if it is negative, or outputting zero if it is zero.

2. The processor according to claim 1, wherein said first input value and said second input value are made the same value, so that said output selection section outputs the absolute value of said same value.

3. The processor according to claim 1, wherein said first input value and said second input value are made the same value, an output value from said output selection section for said input values and a predetermined value are added by an adder, the addition result is outputted from the adder and inputted as said first input value, and said same value is inputted as said second input value, whereby an addition result of adding an absolute value of said first input value and an absolute value of said second input value with reference to zero is outputted.

4. The processor according to claim 1, further comprising an addition section for adding the output value from said output selection section and said second input value, and outputting an addition result of adding an absolute value of the first input value and an absolute value of the second input value with reference to the second input value.

* * * * *